(12) United States Patent
Kepler et al.

(10) Patent No.: US 8,585,935 B2
(45) Date of Patent: Nov. 19, 2013

(54) COMPOSITE FOR LI-ION CELLS AND THE PREPARATION PROCESS THEREOF

(75) Inventors: Keith D. Kepler, Belmont, CA (US); Yu Wang, Foster City, CA (US)

(73) Assignee: Farasis Energy, Inc., Hayward, CA (US)

( * ) Notice: Subject to any disclaimer, the term of this patent is extended or adjusted under 35 U.S.C. 154(b) by 435 days.

(21) Appl. No.: 12/793,581

(22) Filed: Jun. 3, 2010

(65) Prior Publication Data

US 2010/0308278 A1 Dec. 9, 2010

Related U.S. Application Data

(60) Provisional application No. 61/217,778, filed on Jun. 3, 2009.

(51) Int. Cl.
*H01B 1/04* (2006.01)
*H01M 4/48* (2010.01)
*H01M 4/62* (2006.01)
*H01M 4/139* (2010.01)

(52) U.S. Cl.
USPC .................. 252/506; 252/521.2; 429/231.8

(58) Field of Classification Search
USPC .............. 252/506, 521.2; 429/218.1, 231.8, 429/231.95, 232
See application file for complete search history.

(56) References Cited

U.S. PATENT DOCUMENTS

| | | | |
|---|---|---|---|
| 6,171,725 B1 | 1/2001 | Suzuki et al. | |
| 6,413,672 B1 | 7/2002 | Suzuki et al. | |
| 6,436,578 B2 | 8/2002 | Turner et al. | |
| 6,451,486 B1 * | 9/2002 | Davis et al. | 429/232 |
| 6,506,520 B1 | 1/2003 | Inoue et al. | |
| 6,558,841 B1 | 5/2003 | Nakagiri et al. | |
| 6,824,920 B1 | 11/2004 | Iwamoto et al. | |
| 7,235,330 B1 | 6/2007 | Fujimoto et al. | |
| 8,119,288 B2 | 2/2012 | Zhamu et al. | |
| 2002/0009646 A1 | 1/2002 | Matsubara et al. | |
| 2003/0211390 A1 | 11/2003 | Dahn et al. | |
| 2004/0137327 A1 | 7/2004 | Gross et al. | |
| 2006/0034159 A1 | 2/2006 | Sano | |
| 2009/0117466 A1 * | 5/2009 | Zhamu et al. | 429/231.8 |
| 2009/0208844 A1 * | 8/2009 | Kepler et al. | 429/218.1 |

FOREIGN PATENT DOCUMENTS

| | | |
|---|---|---|
| CN | 1797822 A | 7/2006 |
| CN | 101345308 A | 1/2009 |
| EP | 1 205 989 A2 | 5/2002 |

(Continued)

OTHER PUBLICATIONS

Uono et al "Optimized structure of Silicon/carbon/graphite composites . . . ", Jour. Electrochem. Soc. 153(9) A1708-A1713.*

(Continued)

*Primary Examiner* — Mark Kopec
(74) *Attorney, Agent, or Firm* — Blakely Sokoloff Taylor & Zafman LLP

(57) ABSTRACT

Disclosed herein is a composite for Li-ion cells, comprising an active material particle for Li-ion cells and an electronically conductive elastic material bound or attached to the active material particle. According to the present invention, the electronically conductive elastic material bound or attached to the active material particle allows the particle to maintain electronic contact with the electrode laminate matrix despite ongoing movement or expansion and contraction of the active material particles, such that the cycling efficiency and reversible capacity of the Li-ion cells prepared from the composite of the present invention is improved.

7 Claims, 4 Drawing Sheets

(56) References Cited

FOREIGN PATENT DOCUMENTS

Figure 1:
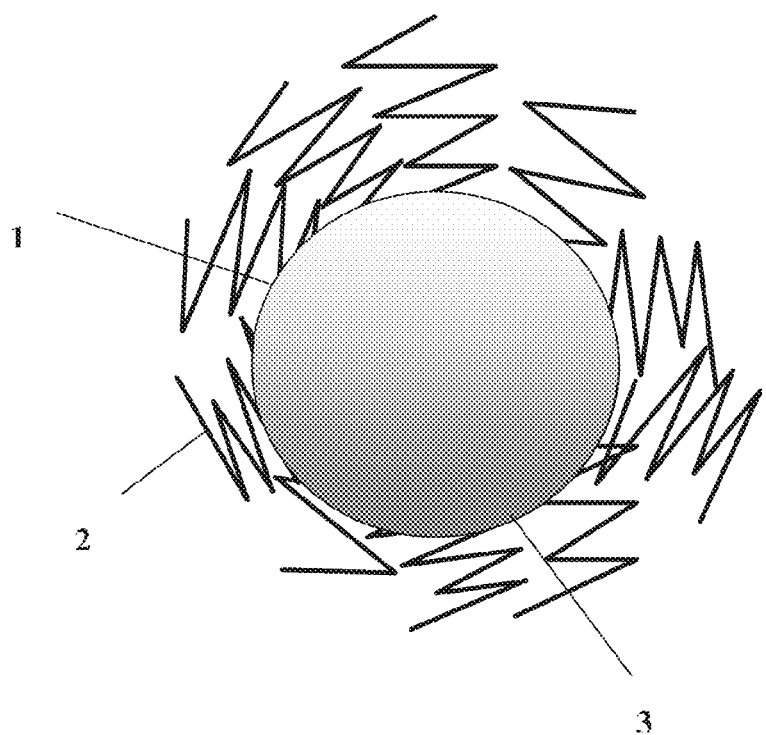

| JP | 8167413 | * | 6/1996 |
| JP | 2002-110143 A | | 4/2002 |
| JP | 2010501970 | | 1/2010 |
| WO | WO 2004/049473 A1 | | 6/2004 |
| WO | WO 2004/109839 A1 | | 12/2004 |

OTHER PUBLICATIONS

J. O. Besenhard, et al., "Dimensionally Stable Li-Alloy Electrodes for Secondary Batteries", Solid State Ionics, vol. 40, Issue 41, pp. 525-529, (1990).

Sung-Min Hwang, et al., "Lithium Insertion in SiAg Powders Produced by Mechanical Alloying", Electrochemical and Solid-State Letters, vol. 4, Issue 7, pp. A97-A100, (2001).

Masaki Yoshio, et al., "Carbon-Coated Si as a Lithium-Ion Battery Anode Material", Journal of the Electrochemical Society, vol. 149, Issue 12, pp. A1598-A1603, (2002).

J. Yang, et al., "Si/C Composites for High Capacity Lithium Storage Materials", Electrochemical and Solid-State Letters, vol. 6, Issue 8, pp. A154-A156, (2003).

Weibing Xing, et al., "Pyrolyzed Polysiloxanes for Use as Anode Materials in Lithium-Ion Batteries", Journal of the Electrochemical Society, vol. 144, Issue 7, pp. 2410-2416, (Jul. 1997).

A. Ulus, et al., "Tin Alloy-Graphite Composite Anode for Lithium-Ion Batteries", Journal of the Electrochemical Society, vol. 149, Issue 5, pp. A635-A643, (2002).

J. O. Besenhard, et al., "Lithium Storage Metal and Alloy Anodes in Lithium Ion Batteries—Prospects and Problems", International Meeting on Lithium Batteries 11, 1 page, (2002).

Nikolay Dimov, et al., "Carbon-Coated Silicon as Anode Material for Lithium Ion Batteries: Advantages and Limitations", Electrochimica Acta, vol. 48, pp. 1579-1587, (2003).

Xiao-Qing Yang, et al., "Structural Studies of the New Carbon-Coated Silicon Anode Materials using Synchrotron-Based in situ XRD", Electrochemistry Communications, vol. 4, pp. 893-897, (2002).

Nikolay Dimov, et al., "Characterization of Carbon-Coated Silicon Structural Evolution and Possible Limitations", Journal of Power Sources, vol. 114, pp. 88-95, (2003).

Hiroyuki Uono, et al., "Optimized Structure of Silicon/Carbon/Graphite Composites as an Anode Material for Li-Ion Batteries", Journal of the Electrochemical Society, vol. 153, Issue 9, pp. A1708-A1713, (2006).

Jing Li, et al., "Effect of Heat Treatment on Si Electrodes using Polyvinylidene Fluoride Binder", Journal of the Electrochemical Society, vol. 155, Issue 3, pp. A234-A238, (2008).

S. D. Beattie, et al., "Si Electrodes for Li-Ion Batteries—A New Way to Look at an Old Problem", Journal of the Electrochemical Society, vol. 155, Issue 2, pp. A158-A163, (2008).

Jing Li, et al., "Sodium Carboxymethyl Cellulose—A Potential Binder for Si Negative Electrodes for Li-Ion Batteries", Electrochemical and Solid-State Letters, vol. 10, Issue 2, pp. A17-A20. (2007).

M. N. Obrovac, et al., "Reversible Cycling of Crystalline Silicon Powder", Journal of the Electrochemical Society, vol. 154, Issue 2, pp. A103-A108, (2007).

Z.S. Wen et al., "High Capacity Silicon/Carbon Composite Anode Materials for Lithium Ion Batteries", Electrochemistry Communications 5 (2003), pp. 165-168.

Wilson, A.M., et al., Pyrolyzed pitch-polysilane blends for use as anode materials in lithium ion batteries II: the effect of oxygen. Solid State Ionics, 1997 100(3,4) p. 259-266.

English translation of Chinese Office Action for Chinese Patent Application No. 2010101920347, 3 pages, after Jun. 3, 2009.

English translation of Chinese Search Report for Chinese Patent Application No. 2010101920347, 2 pages, after Jun. 3, 2009.

* cited by examiner

COMPOSITE FOR LI-ION CELLS AND THE PREPARATION PROCESS THEREOF

CROSS REFERENCE

This application claims priority from the following U.S. provisional patent application: "Stabilized Active materials for Li-ion Cells" filed on Jun. 3, 2009, having a Provisional Patent Application No. U.S. 61/217,778. This application is incorporated herein by reference.

FIELD OF INVENTION

This invention relates to a composite for Li-ion cells and the preparation process thereof.

BACKGROUND

In Li-ion batteries, electrodes are prepared by preparing a slurry in a solvent such as N-methyl pyrrolidone (NMP) of the anode or cathode active material particles with conductive additives such as carbon and a binder such as polyvinylidene fluoride (PVDF). The slurry is coated onto a current collector foil and dried, creating a composite porous laminate with good electronic conductivity. The electrodes are used to make a cell in which the electrolyte is absorbed into the pores of the electrode laminate. Thus the active material particles are both in electrical contact with the current collector to provide a path for the electrons produced or consumed during cell discharge and charge, and physical contact with the electrolyte to provide a continuous ionic path for Li-ions to diffuse between the anode and cathode electrodes as the cell is cycled. If a particular particle becomes fully or partially electronically isolated from the body of the conductive electrode laminate its contribution to the reversible capacity of the cell will diminish or be lost. The loss of electronic contact due to expansion and contraction of the particles also manifests itself in an excessively large loss of capacity on the first cycle, when the greatest change in electrode active material volume occurs. On subsequent cycles, the electronic isolation of multiple particles leads to an overall increase in the cell impedance and a loss of reversible capacity as more and more of the active material is isolated. In typical Li-ion cells this is a key aging mechanism eventually leading to cell failure. The process is accelerated by deep discharge cycling as the active anode or cathode particles expand and contract naturally as Li-ions move in and out of their structures. It is also accelerated at elevated temperatures where the binder can absorb the electrolyte to form gel like material that can flow, leading to separation of the active particles from the conductive additive matrix. Mitigation of this failure mechanism is critical to the development and manufacture of Li-ion batteries that can survive the thousands of cycles and years of life required to meet the demands of emerging applications in the automotive, military, energy transmission and telecommunications markets.

To date, efforts to address electrode active material conductivity issues have included coating the active materials with carbon layers. However, while increasing the inherent electronic conductivity of the active material particle, it does not solve the problem of maintaining contact with the laminate conductive matrix. Such particles can still become isolated as the cell is cycled or aged.

SUMMARY OF INVENTION

To address the problems of the prior art, an object of the present invention is to provide a composite for Li-ion cells, comprising an active material particle for Li-ion cells and an electronically conductive elastic material bound or attached to the active material particle.

According to the present invention, the electronically conductive elastic material bound or attached to the active material particle allows the particle to maintain electronic contact with the electrode laminate matrix despite ongoing movement or expansion and contraction of the active material particles, such that the cycling efficiency and reversible capacity of the Li-ion cells prepared from the composite of the present invention is improved.

As long as the electronically conductive elastic material is bound or attached to the active material particle, the above effect can be obtained, so the content of the electronically conductive elastic material is not limited to any range. In order to significantly improve the cycling efficiency of the Li-ion cells prepared from the composite of the present invention while maintaining the specific capacity of the Li-ion cells, the content of the electronically conductive elastic material is preferably 0.5-6 parts by weight relative to 100 parts by weight of the active material particle, more preferably 2-5 parts by weight.

The electronically conductive elastic material may be any material that is electronically conductive and is capable of reversibly expanding and contracting, preferably an electronically conductive elastic carbon material.

The electronically conductive elastic carbon material is preferably expanded graphite due to its low cost, good conductivity, and excellent ability of reversibly expanding and contracting.

The active material particle may be a cathode active material particle or anode active material particles. The active material particle is preferably primarily a cathode active material. The active material particle may have a conventional size suitable to be used in Li-ion cells.

The cathode active material particle may be any active material conventionally used in the cathode electrode for Li-ion cells. For example, the cathode active material particle is at least one selected from the group consisting of $LiCoO_2$, $LiMn_2O_4$, $Li(NiCoMn)O_2$, $Li(NiCo)O_2$, and $LiFePO_4$.

The electronically conductive elastic material is preferably bound or attached to the active material particle by an attaching phase. The content of the attaching phase is preferably 0.5-5 parts by weight relative to 100 parts by weight of the active material particle, more preferably 1.5-3 parts by weight.

In a preferred embodiment, the attaching phase comprises non-lithium ion conducting material that does not react with the active cathode phase at the temperature of formation so as not to affect the composition or structure of the active material phase. The attaching phase composition is selected such that it can preferably perform its attaching role in the composite after firing at less than 650° C. The attaching phase composition is selected such that it can preferably perform its attaching role in the composite after coating by aqueous methods. The attaching phase comprising non-lithium ion conducting materials that do not react with the active cathode phase at the temperature of formation may comprise a metal oxide, oxides of the metalloids, lithium carbonate, and oxides of the lanthanoids.

The metal oxide may be $M_xO_y$ in which M=Co, Cu, V, Ti, Al or W, x=1-2 and y=2-3.

The oxides of the metalloids may be $B_2O_3$ or $SiO_2$.

The oxides of the lanthanides may be La—O, or Yb—O.

In another preferred embodiment, the attaching phase is a melting attaching or glue phase comprising a Li-ion conducting material. According to this embodiment, the electronically conductive elastic material can be firmly bound or attached to the active material particle such that the cycling efficiency of the Li-ion cells prepared from the composite can be further improved, and at the same time Li-ion conductivity is not affected.

The content of the melting attaching or glue phase is preferably 0.5-5 parts by weight relative to 100 parts by weight of the active material particle, more preferably 1.5-3 parts by weight.

The attaching phase comprising a Li-ion conducting material may be any material that is adhesive upon melting and is capable of conducting Li-ions. The Li-ion conducting material preferably melts at a low temperature such as less than 650° C. The Li-ion conducting material preferably melts at a low temperature such as less than 300° C. The Li-ion conducting material is preferably at least one selected from the group consisting of oxy-halide glasses, lithium oxide glasses based on $B_2O_3$, and lithium oxide glasses based on $P_2O_5$.

The oxy-halide glasses may be $B_2O_3$—$Li_2O$—LiX (X=F or Cl).

The oxide glasses based on $B_2O_3$ may be $Li_2O$—$B_2O_3$ or $Li_2O$—$B_2O_3$—$SiO_2$.

The oxide glasses based on $P_2O_5$ may be $Li_2O$—$P_2O_5$ or $Li_2O$—$P_2O_5$—$Al_2O_3$.

Another object of the present invention is to provide a preparation process for the composite according to the present invention, including binding or attaching the electronically conductive elastic material onto the active material particle. Preferably, the melting attaching or glue phase comprising the Li-ion conducting material is used.

Either aqueous method or solid state method may be used.

The aqueous method may include the steps of:
(1) Mixing the active material particle, the electronically conductive elastic material, and precursor material for the attaching phase in water;
(2) Evaporating the water;
(3) optionally, firing the mixture below 650° C.

In step (1), relative to 100 parts by weight of the active material particle, the amount of the electronically conductive elastic material is preferably 0.5-4 parts by weight, more preferably 1-3 parts by weight, and the amount of the precursor material for the attaching phase is preferably 0.5-4 parts by weight, more preferably 1-3 parts by weight. The amount of water is not restricted, as long as the attaching phase material precursors are well dissolved. Preferably, water is used in such amount that other materials are completely immersed in water in order to mix the materials well.

In the aqueous method, the attaching phase preferably can be formed by precipitation from the aqueous solution, requiring no additional firing process. In the aqueous method, the attaching phase more preferably can be formed by a sol-gel process. In step (3), the firing is preferably performed for 1-4 hr at a temperature higher than the melting temperature of precursor material for the attaching phase and lower than the oxidation or degeneration of the electronically conductive elastic material, such as 400-600° C. If necessary the mixtures can be fired under inert atmosphere such as $N_2$, Ar etc. to prevent the oxidation at high firing temperature.

The solid state method may include the steps of:
(1) Mixing the active material particle, the electronically conductive elastic material, and precursor material for the attaching phase;
(2) Firing the mixture below 650° C., preferably 400-600° C.

In step (1), relative to 100 parts by weight of the active material particle, the amount of the electronically conductive elastic material is preferably 2-5 parts by weight, more preferably 1-2.5 parts by weight, and the amount of the precursor material for the attaching phase is preferably 2-5 parts by weight.

In step (3), the firing is preferably performed for 1-4 hr at a temperature higher than the melting temperature of precursor material for the attaching phase and lower than the oxidation or degeneration of the electronically conductive elastic material, such as 400-600° C. If necessary the mixtures can be fired under inert atmosphere such as $N_2$, Ar etc. to prevent the oxidation at high firing temperature.

The precursor material for the attaching phase may be any material that can be formed to the material included in the attaching phase as stated above by precipitation or by the firing. For example, LiF/LiOH/$Li_2B_4O_7$ is used as precursor material for $B_2O_3$—$Li_2O$—LiX.

The method provides advantages over other methods of modifying the surface of lithium ion battery active materials by permitting the physical attachment of a conductive material to active materials that are not stable to high temperature treatments, because they are not stable to high temperature treatments such as the metal oxide cathode materials.

The composite according to the present invention can be used as active material in anode and/or cathode of Li-ion cells.

BRIEF DESCRIPTION OF THE ACCOMPANYING DRAWINGS

FIG. 1: Illustration of the composite according to one embodiment of the present invention.

Figure 2:
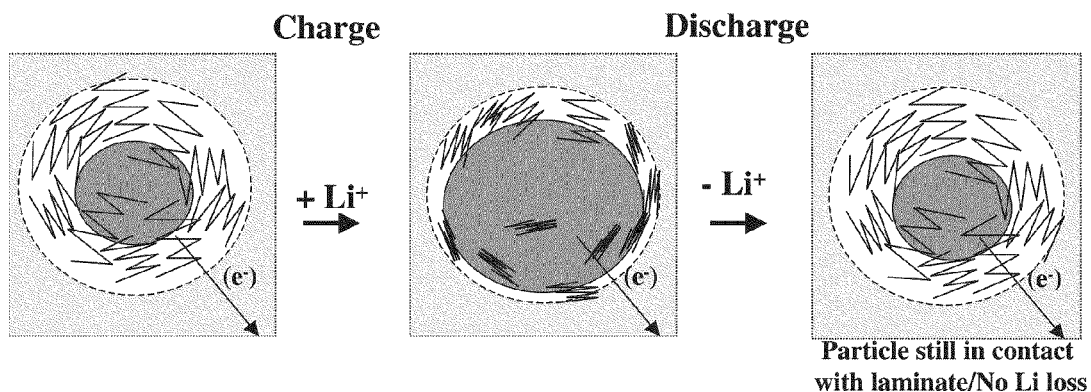

FIG. 2: Illustration of electronically conductive elastic material maintaining electrical contact with the conductive laminate during cycling and volumetric expansion and contraction.

Figure 3:
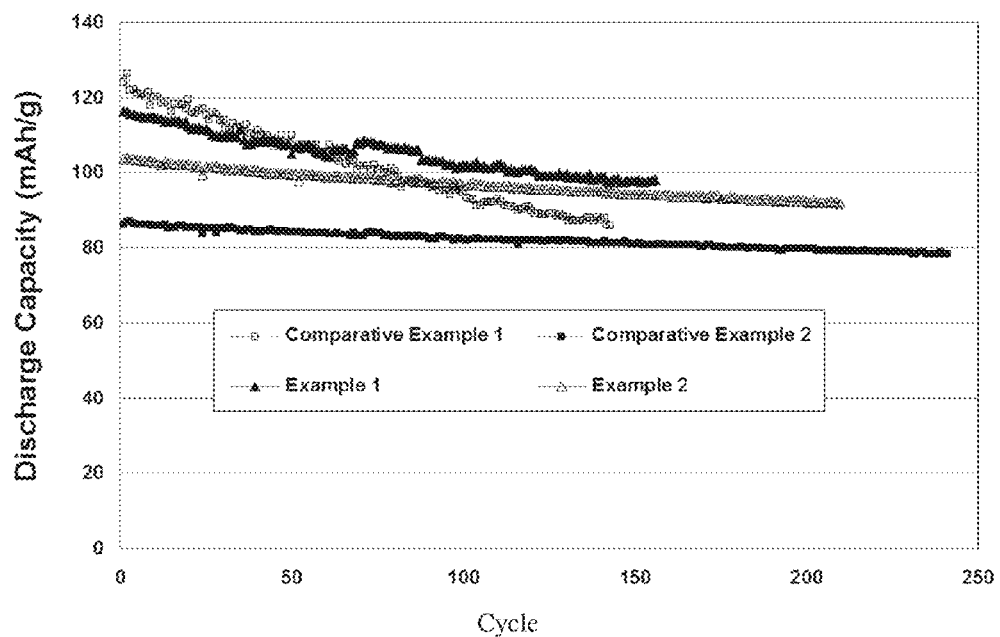

FIG. 3: Discharge capacity vs cycle for surface modified spinel, $Li_{1.05}Mn_{1.95}O_2$ made in Examples 1, 2 compared with those of Comparative Examples 1 and 2.

Figure 4:
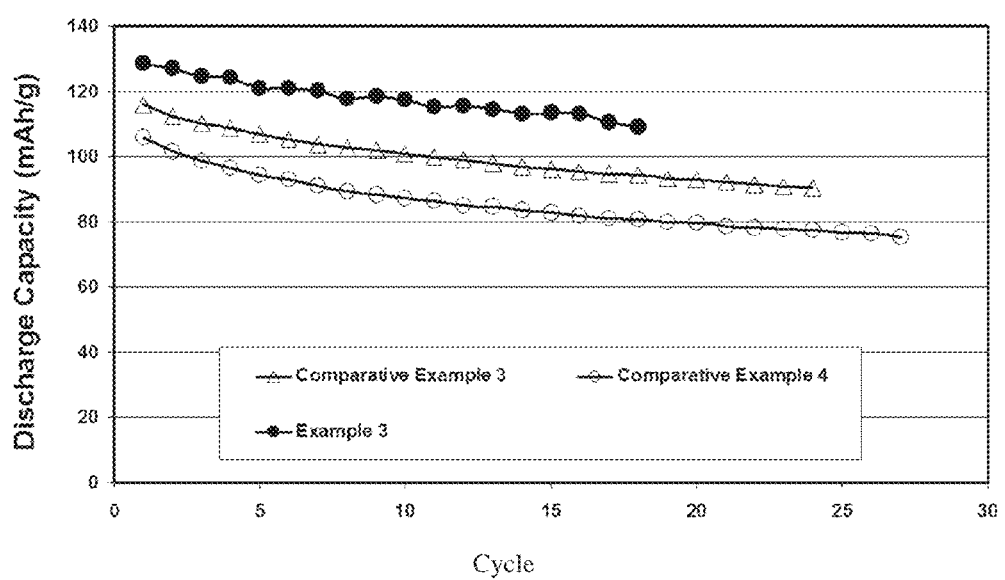

FIG. 4: Discharge capacity vs cycle for surface modified spinel, $Li_{1.05}Mn_{1.95}O_2$ made in Example 3 compared with those of Comparative Examples 3 and 4.

DETAILED DESCRIPTION

FIG. 1 shows an illustration of the composite including the active material particle 1, the electronically conductive elastic material 2 attached on the active material particle 1, and optionally the melting attaching or glue phase 3.

FIG. 2 shows illustration of how the electronically conductive elastic material will maintain electrical contact, which is critical to reversibly cycle the active component particles, to the electrode conductive laminate, during expansion and contraction. It could be seen from the FIG. 4 that, after a cycle of charging and discharging, the active material particles are still in contact with laminate and there is no Li loss, regardless of volumetric changes of the active material particles.

Hereinafter, the present invention will be described in ways of examples. However, it will be recognized by the skilled in the art that these examples are provided in purpose of illustration rather than limitation to the range of the present invention.

COMPARATIVE EXAMPLE 1

Untreated Cathode Material $Li_{1.05}Mn_{1.95}O_4$
Physically Mixed with Graphite The cathode material $Li_{1.05}Mn_{1.95}O_4$, was physically mixed with 4% expanded graphite to prepare an electrode of the cathode material, acetylene black, graphite and Polyvinylidene difluoride binder in the formulation of 90%/2%/4%/4%. The electrode was then evaluated using a Size 2032 coin cell. The cells had the configuration: Li/1M LiPF$_6$ in 1:1 ethylene carbonate:diethyl carbonate/cathode material.

COMPARATIVE EXAMPLE 2

Lithium-ion Conducting Glass Surface Modified Li$_{1.05}$Mn$_{1.95}$O$_4$

The cathode active material Li$_{1.05}$Mn$_{1.95}$O$_4$ (95% by weight) and a lithium-ion conducting glass component (5% by weight of LiF/LiOH/Li$_2$B$_4$O$_7$ in a molar ratio of 1:4.6:0.9) were weighed and dry-mixed using a Roll Mill apparatus for 12 hours. The roll-milled mixture of Li$_{1.05}$Mn$_{1.95}$O$_4$ and the glass component was then fired in air at 500° C. for 2 hours. This produced a lithium-ion conducting glass surface modified spinel cathode material.

COMPARATIVE EXAMPLE 3

Non-lithium-ion Conducting Material Surface Modified Li$_{1.05}$Mn$_{1.95}$O$_4$ Non-lithium-ion conducting material, here boron oxide, was used to modify the surface of same base lithium manganese oxide spinel cathode material with 5% B$_2$O$_3$ by weight including the aqueous process described in this example. To prepare the surface modified Li$_{1.05}$Mn$_{1.95}$O$_4$ cathode material using the aqueous method, sufficient boric acid was weighed out to produce a final material composition containing 5% B$_2$O$_3$ by weight. Specific amount of boric acid, which will produce 5% by weight of B$_2$O$_3$ in final product, was dissolved in distilled water, with a ratio of ~10 ml water per gram boric acid. The solution was stirred at room temperature, or up to 100° C. Once boric acid dissolved, the base Li$_{1.05}$Mn$_{1.95}$O$_4$ powder was added to the solution and transferred into a sealed container, then mixed using roll-miller with ceramic balls for 12 hrs. The distilled water was evaporated and then the mixture was dried further in an oven at 110° C. for 3 hours. The dried material was ground up using a mortar and pestle and then fired in air at 500° C. for 2 hours. This produced a 5%-by-weight non-lithium-ion conducting B$_2$O$_3$ surface modified spinel cathode material.

COMPARATIVE EXAMPLE 4

Non-lithium-ion Conducting Material and Carbon Black Surface Modified Li$_{1.05}$Mn$_{1.95}$O$_4$ To prepare the surface modified Li$_{1.05}$Mn$_{1.95}$O$_4$ cathode material by the aqueous method sufficient boric acid and carbon black were weighed out to produce a final cathode material composition containing 2.5% B$_2$O$_3$ by weight, and another 2.5% by weight of carbon black. The boric acid was dissolved in a small amount of distilled water (~10 ml water per gram boric acid), and 2.5% carbon black by weight and the base lithium manganese oxide spinel (95% by weight) were added to the solution. The solution was stirred and then transferred to a container, further mixed using roll-miller for 12 hrs. The distilled water was evaporated and then the mixture was dried further in an oven at 110° C. for 3 hours. The dried material was ground up using a mortar and pestle and then fired in air at 500° C. for 2 hours. This produced a 5%-by-weight non-lithium-ion conducting B$_2$O$_3$ and carbon black surface modified spinel cathode material.

EXAMPLE 1

Lithium-ion Conducting Glass and Expanded Graphite Surface Modified Li$_{1.05}$Mn$_{1.95}$O$_4$ The same Li$_{1.05}$Mn$_{1.95}$O$_4$ powder used in Comparative Examples was used as the base lithium manganese oxide spinel material in this example of the method of this invention.

The solid-state coating method was used to treat the base material as follows to produce a final composite material containing approximately 2% by weight, lithium-ion conducting B$_2$O$_3$-based glass and expanded graphite. 0.4 g LiF/LiOH/Li$_2$B$_4$O$_7$ in a molar ratio of 1:4.6:0.9, 0.4 g of expanded graphite (Superior Expanded Graphite), and 39.2 grams of the base Li$_{1.05}$Mn$_{1.95}$O$_4$ cathode material were weighed out and placed into a sealed roll mill container. The container and its contents were placed onto a Roll Mill apparatus and roll-milled for 12 hours. The mixture was then fired in air at 500° C. for 2 hours.

EXAMPLE 2

Lithium-ion Conducting Glass and Expanded Graphite Surface Modified Li$_{1.05}$Mn$_{1.95}$O$_4$ The same method as for Example 1, only the percentage for which the surface being modified is different, was used for this example. 1 g LiF/LiOH/Li$_2$B$_4$O$_7$ in a molar ratio of 1:4.6:0.9, 1 g of expanded graphite (Superior Expanded Graphite), and 38 grams of the base Li$_{1.05}$Mn$_{1.95}$O$_4$ cathode material were weighed out and placed into a sealed roll mill container. The container and its contents were placed onto a Roll Mill apparatus and roll-milled for 12 hours. The mixture was then fired in air at 500° C. for 2 hours. This produces a final composite material containing approximately 5% by weight of lithium-ion conducting glass and expanded graphite.

EXAMPLE 3

Non-lithium-ion Conducting Material and Expanded Graphite Surface Modified Li$_{1.05}$Mn$_{1.95}$O$_4$ The same Li$_{1.05}$Mn$_{1.95}$O$_4$ powder used in Comparative Examples 1 and 2 was used as the base lithium manganese oxide spinel material in this example of the method of this invention. The aqueous coating method was used to treat the base material as follows to produce a final composite material containing approximately 5% by weight, B$_2$O$_3$ and expanded graphite. 1.77 g of boric acid (H$_3$BO$_3$, 99.99% from Alfa Asha), which will produce 1 g of non-lithium ion conducting material, B$_2$O$_3$, in final product, was weighed out and dissolved into ~10 ml distillated water. 1 g of expanded graphite (Superior Expanded Graphite) was also weighted and added to the above solution. Last, 38 grams of the base Li$_{1.05}$Mn$_{1.95}$O$_4$ cathode material was weighed out and slowly added into the solution. The slurry, along with fifty ceramic mixing balls, was then placed into a sealed roll mill container. The container and its contents were placed onto a Roll Mill apparatus and roll-milled for 12 hours. The roll-milled mixture of Li$_{1.05}$Mn$_{1.95}$O$_4$ and the boric acid and expanded graphite was removed, and dried further in an oven at 110° C.

for 3 hours. The dried material was ground up using a mortar and pestle and then fired in air at 500° C. for 2 hours.

EXAMPLE 4

Preparation of an Electrochemical Cell with Spring Like Electronically Conductive Carbon Modified Cathodes The cathode materials $LiMn_2O_4$, $Li_{1.05}Mn_{1.95}O_4$, and $Li_{1.16}Mn_{1.84}O_4$ and the materials made by methods described in Comparative Examples 1-4 and Examples 1-3 were evaluated in coin cells against a counter lithium electrode. The coin cells were Size 2032, with dimensions 20 mm and 3.2 mm high. The cells had the configuration: Li/1M $LiPF_6$ in 1:1 ethylene carbonate:diethyl carbonate/cathode material. The electrodes were fabricated with the modified or unmodified spinel cathode materials by preparing a slurry of the cathode material, acetylene black, graphite and Polyvinylidene difluoride binder (90%/2%/4%/4%) in n-methylpyrolidinone. The slurry was coated onto an Al foil current collector and dried under vacuum at 80° C. Electrodes were punched from the coating and used to make the coin cells. Metallic Lithium foil was used as the counter electrode. The coin cells were charged and discharged at a constant current within the voltage range of 3V-4.3 V. The cells were cycled in an incubator set at 25° C.

The electrochemical voltage profiles of all of the treated and untreated baseline materials were similar, independent of the method used to prepare them. FIG. 3 is a graphical depiction of the discharge capacity vs. cycle number for the materials synthesized by methods described in Comparative Example 1 and 2, and Examples 1 and 2 wherein the base spinel cathode material was the lithium rich spinel, $Li_{1.05}Mn_{1.95}O_4$ and the glue phase was a lithium-ion conducting materials. The coin cells were cycled at a constant current, C/20 rate (20 hours for 100% discharge). FIG. 4 shows the cycling capacity vs cycle for surface modified spinel, $Li_{1.05}Mn_{1.95}O_2$ materials using 2%, and 5%, by weight, of Non-lithium-ion conducting materials (here $B_2O_3$), carbon black and non-lithium-ion conducting material by 1:1 ratio, and expanded graphite and non-lithium-ion conducting material by 1:1 ratio (i.e., Comparative Examples 3, 4, and Example 3). The coin cells were cycled at a constant current, C/10 rate (10 hours for 100% discharge). The surface modified materials containing lithium-ion conducting material, whatever modified by lithium-ion conducting material alone, or lithium-ion conducting material and expanded graphite, show greater improvements in the cycling stability over that of base material mixed physically with graphite (FIG. 3). Using this method and a 2% by weight lithium-ion conducting glass and expanded graphite coating (Example 1 in FIG. 3), while cycling stability is greatly improved, it also deliver a higher cycling capacity. With 5% by weight surface modification, the cathode materials prepared in Example 3 using expanded graphite and non-lithium-ion conducting material (here $B_2O_3$) coating shows a much higher cycling capacity and a improved cycling stability over the treated $Li_{1.05}Mn_{1.95}O_4$ materials using the same non-lithium-ion conducting material alone, or using carbon black and the same non-lithium-ion conducting material in Comparative Example 3, and 4, respectively (FIG. 4). The cathode materials made using the expanded graphite and glass coating method of this invention have both higher capacity and improved capacity retention than the other methods. The weight percent by which the surface of spinel has been modified has a significant impact on the initial capacity.

The invention claimed is:

1. A composite for Li-ion cells, comprising an active material particle for Li-ion cells and an electronically conductive elastic carbon material bound or attached to the active material particle by an attaching phase, wherein the electronically conductive elastic carbon material comprises expanded graphite and the attaching phase is selected from the group consisting of a non-lithium ion conducting material that does not react with the active cathode phase at the temperature of formation and a melting attaching or glue phase that includes a Li-ion conducting material.

2. The composite of claim 1 wherein the active material particle comprises a cathode active material particle.

3. The composite of claim 2 wherein the cathode active material particle is at least one selected from the group consisting of $LiCoO_2$, $LiMn_2O_4$, $Li(NiCoMn)O_2$, $Li(NiCo)O_2$, and $LiFePO_4$.

4. The composite of claim 1 wherein the non-lithium ion conducting material is at least one selected from the group consisting of a metal oxide, oxide of the metalloid, lithium carbonate, and oxide of the lanthanoid.

5. The composite of claim 4 wherein the metal oxide is MxOy in which M=Co, Cu, V, Ti, Al, or W, x=1-2 and y=2-3, the oxide of the metalloid is $B_2O_3$ or $SiO_2$ and the oxide of the lanthanide is La—O, or Yb—O.

6. The composite of claim 1 wherein the Li-ion conducting material is at least one selected from the group consisting of oxy-halide glass, lithium oxide glass based on $B_2O_3$, and lithium oxide glass based on $P_2O_5$.

7. The composite of claim 6 wherein the oxy-halide glass is $B_2O_3$—$Li_2O$-LiX (X=F or Cl), the oxide glass based on $B_2O_3$ is $Li_2O$—$B_2O_3$ or $Li_2O$—$B_2O_3$—$SiO_2$, the oxide glass based on $P_2O_5$ is $Li_2O$—$P_2O_5$ or $Li_2O$—$P_2O_5$—$Al_2O_3$.

* * * * *